(No Model.)

H. A. DALRYMPLE.
BALL CASTER.

No. 440,346. Patented Nov. 11, 1890.

WITNESSES
F. L. Durand
E. A. Finckel

INVENTOR
Hartwell A. Dalrymple
by Wm. H. Finckel
Attorney

UNITED STATES PATENT OFFICE.

HARTWELL A. DALRYMPLE, OF RUTLAND, VERMONT.

BALL CASTER.

SPECIFICATION forming part of Letters Patent No. 440,346, dated November 11, 1890.

Application filed July 1, 1890. Serial No. 357,391. (No model.)

*To all whom it may concern:*

Be it known that I, HARTWELL A. DALRYMPLE, a citizen of the United States, residing at Rutland, in the county of Rutland and State of Vermont, have invented a certain new and useful Improvement in Ball Casters, of which the following is a full, clear, and exact description.

This invention relates to ball casters for furniture, sewing-machines, table-legs, fireproof and burglar-proof safes, and other articles or apparatus to which casters are or may be applied.

The invention consists in a ball caster in which the socket for the ball is made angular, in order that the bearing of the ball therein may be at points only, instead of having an extended superficial bearing, for the purpose of reducing friction and rendering the operation of the caster easier—that is to say, to prevent undue binding of the ball in its bearing or socket—the said ball being retained in its bearing or socket by lips which extend below the horizontal diameter of the ball, all as I will proceed now more particularly to set forth and finally point out and claim.

Figure 1:
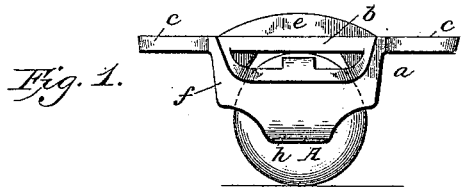
Figure 3:
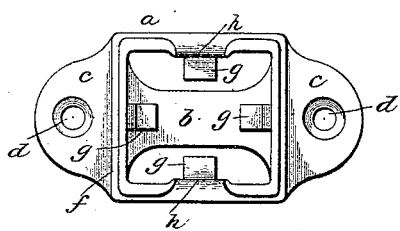
Figure 2:
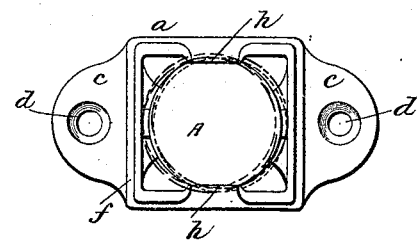
Figure 5:
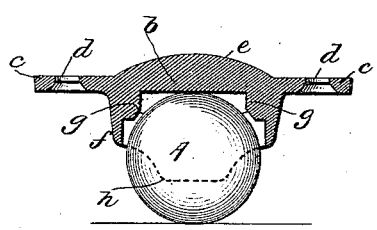
Figure 4:
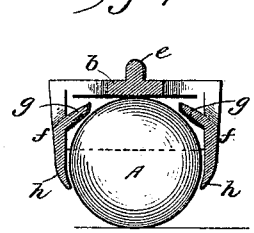
Figure 6:
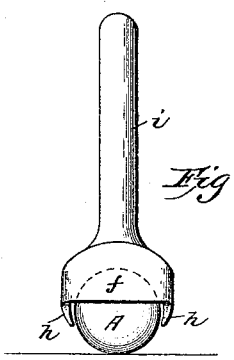

In the accompanying drawings, illustrating my invention, in the several figures of which like parts are similarly designated, Figure 1 is a side elevation. Fig. 2 is a bottom plan view showing by dotted lines the several positions the ball may assume in its socket. Fig. 3 is a bottom plan view of the socket or bearing with the ball removed. Fig. 4 is a vertical cross-section. Fig. 5 is a vertical longitudinal section, and Fig. 6 is an elevation of a modification.

In the form of ball caster shown in Figs. 1 to 5 the socket or bearing $a$ comprises a base-plate $b$, having ears $c$, provided with holes $d$ for the passage of screws or other fastening devices to secure the ball caster in place. The base-plate is provided with a longitudinal lug or projection $e$ to enter the article to which the caster is to be applied, to re-enforce the connection of the said caster with such article, and to assist the fastenings in preventing lateral displacement. The inner surface of the base-plate $b$ is made plain and flat, to afford a bearing for the ball A, the ball touching such plate tangentially or at right angles to its vertical axis. The base-plate is provided with an angular box or socket $f$, and I prefer to make said box or socket substantially equilateral, but it may be in the form of a rectangle; but whether quadrilateral or rectangular the said box or socket is sufficiently larger than the ball to permit of movement of the said ball within the said socket or box without binding. Lugs or projections $g$—one for each side—are made in the box next to the base-plate, in order to arrest the movement of the ball. Two of the sides of the box or socket are extended downwardly to form lips $h$, which lips are curved inwardly, as shown in the section Fig. 4, and extend below the horizontal diameter of the ball to confine the ball within the socket, but without bearing upon the said ball. It will be understood, therefore, that the socket or box forms simply a receptacle for the ball, in which the ball has bearings at points only instead of superficially.

As indicated in Fig. 2 by the dotted circles, the ball in the movement of the article to which the caster is applied will tend to have bearings upon the projections $g$ by traveling toward the angles of the socket or box.

Instead of providing ears $c$ with holes $d$ for securing the ball caster in place to a receptacle to which it is to be applied, I may employ the ordinary spindle $i$; but otherwise such caster embodies the features hereinbefore described. So, also, the means for securing the caster to the article to which it is to be applied will be such as are best adapted to that article. In the case of safes and other very heavy articles the ball caster may be supplied with a number of balls, each ball having its own box or socket.

I am aware that ball casters have been constructed with sockets corresponding in outline with the ball and in which the ball fits and makes a superficial contact; and I am also aware that the sockets or bearings of ball casters have been made oblong or rectangular in outline, as in my patent, No. 424,467, dated April 1, 1890.

What I claim is—

A ball caster comprising a ball or sphere and an angular or straight-sided socket having a flat base-plate, and means for attaching the caster to the article to which it is to be applied, and a square box two of whose sides are provided with lips and the bottom of which box next to the base-plate is provided with lugs or projections on each side, upon which and the base the ball takes points of bearing in its movements in said box, the said box having a cubical area somewhat in excess of the ball to permit the ball to roll in said box, the socket with its base-plate, box, lips, and attaching means being made integral, and the ball being held from escape therefrom by the lips, substantially as described.

In testimony whereof I have hereunto set my hand this 28th day of June, A. D. 1890.

HARTWELL A. DALRYMPLE.

Witnesses:
J. A. MERRILL,
FRED M. BUTLER.